United States Patent [19]

Greene, Jr.

[11] Patent Number: 4,622,777
[45] Date of Patent: Nov. 18, 1986

[54] PLANTER AND METHOD OF PRODUCING SAME

[76] Inventor: George J. Greene, Jr., 616 N. Eldridge, Houston, Tex. 77079

[21] Appl. No.: 660,452

[22] Filed: Sep. 26, 1984

Related U.S. Application Data

[63] Continuation of Ser. No. 505,102, Jun. 10, 1983, abandoned.

[51] Int. Cl.$^4$ .............................................. A01G 9/02
[52] U.S. Cl. ...................................................... 47/67
[58] Field of Search .................. 47/39, 65, 66, 67, 82, 47/83, 87

[56] References Cited

U.S. PATENT DOCUMENTS

| | | | |
|---|---|---|---|
| D. 262,274 | 12/1981 | Lahr | 47/82 |
| 717,489 | 12/1902 | Worden | 446/53 |
| 4,117,630 | 10/1978 | Kalas | 47/67 |
| 4,154,022 | 5/1979 | Costanzo | 47/66 |
| 4,201,013 | 5/1980 | Robbins | 47/47 |
| 4,446,653 | 5/1984 | Morgan, Jr. | 47/67 |

Primary Examiner—Robert A. Hafer
Assistant Examiner—Bradley M. Lewis
Attorney, Agent, or Firm—Vinson & Elkins

[57] ABSTRACT

A rotatable planter and a method of producing such planter wherein the planter includes a thermoplastic tube with a plurality of pockets therein, a bottom and means for supporting the tube so that it is rotatable either by the wind to which it is exposed or by a stand on which it is supported. The improved method includes the steps of cutting a plurality of radial slots in a tube of preselected length, heating the area above and below each slot and forming the upper portion of the pocket above the slot inward and forming the lower portion of the pocket below the slot outward.

3 Claims, 15 Drawing Figures

FIG. 1
FIG. 2
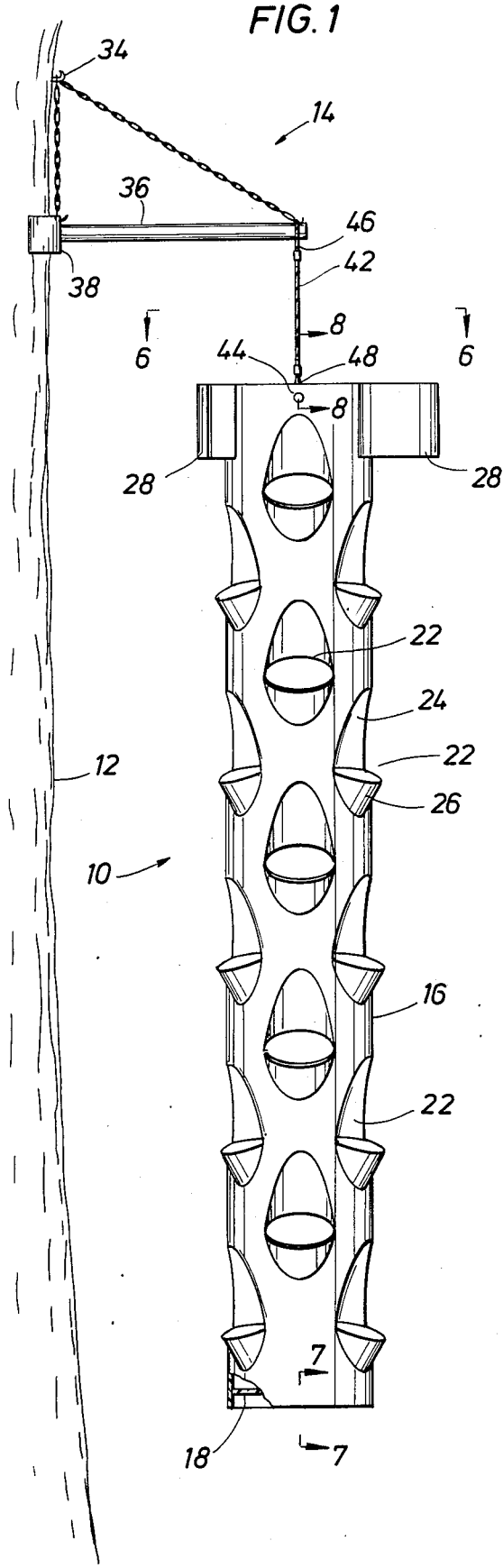
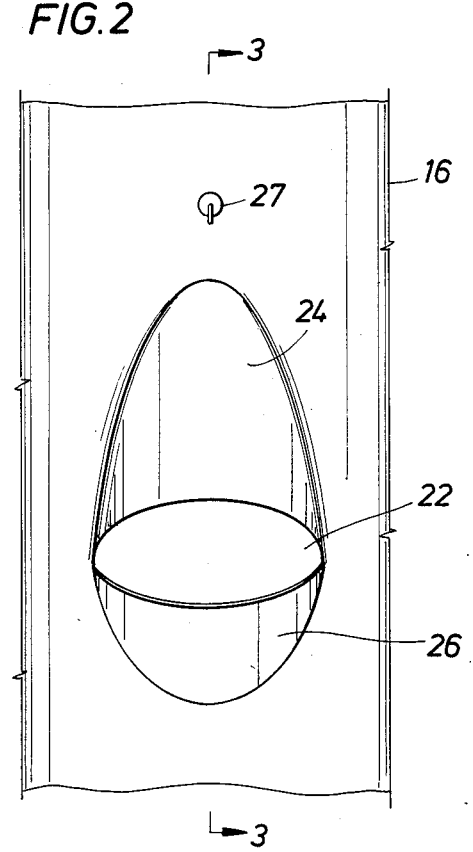
FIG. 3

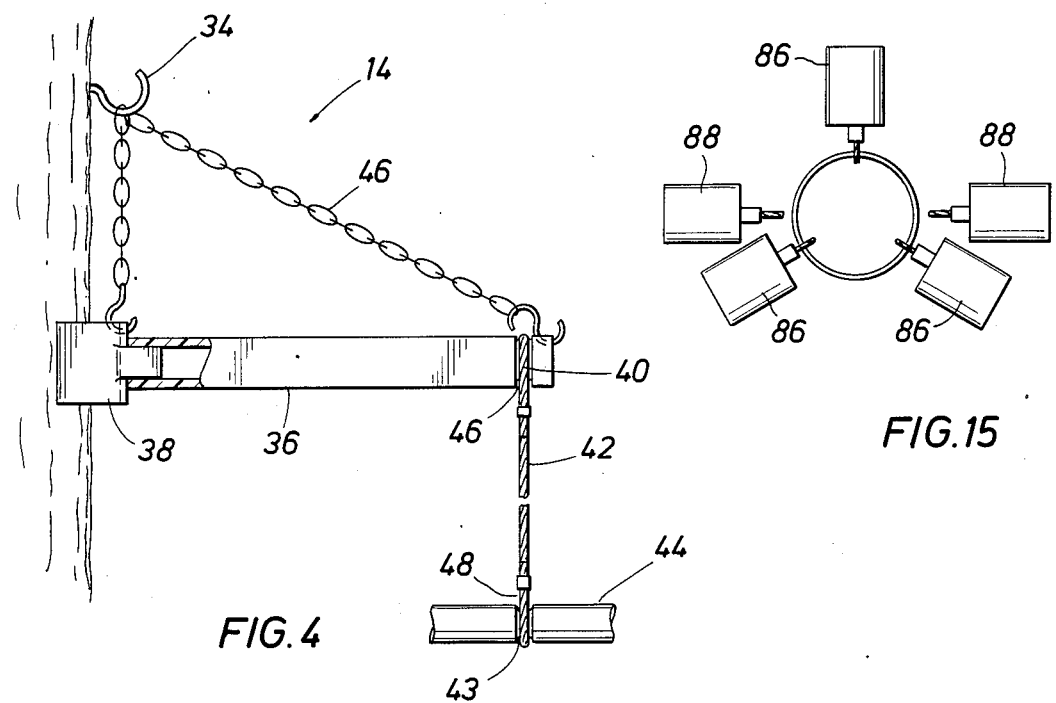
FIG. 4
FIG. 15
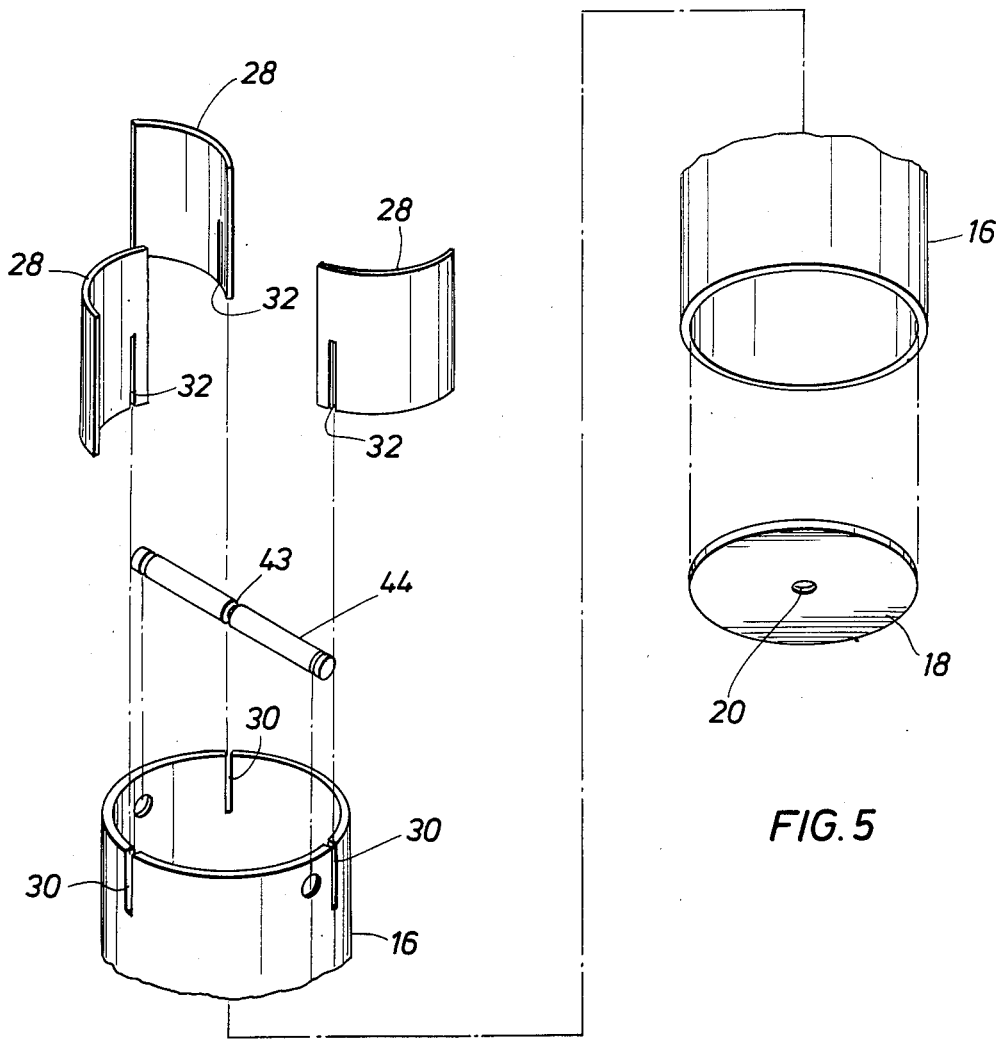
FIG. 5

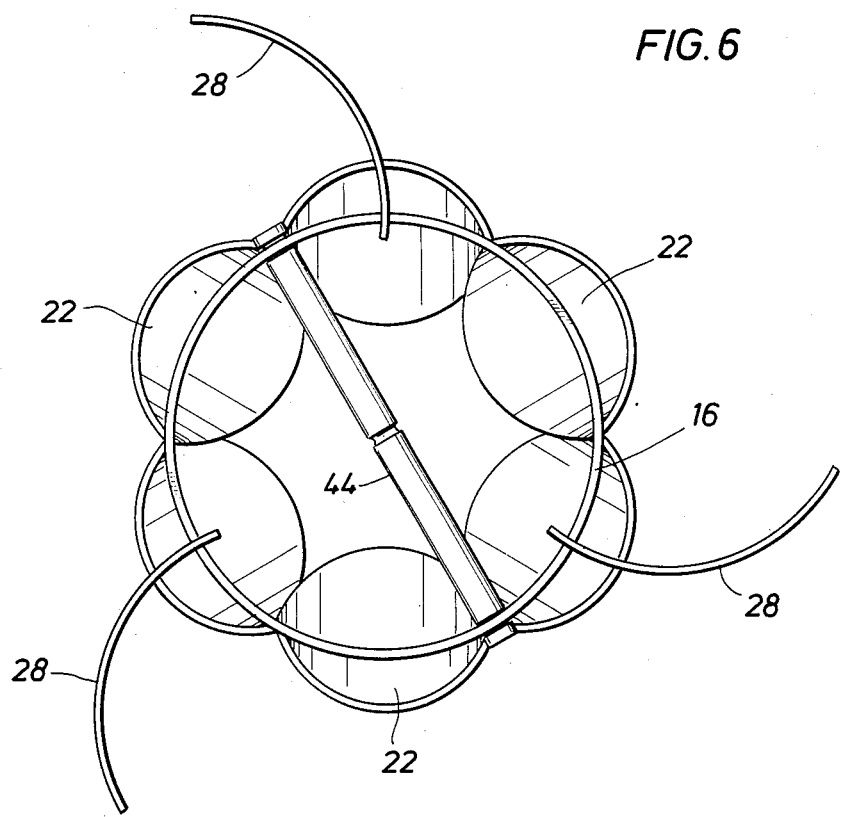
FIG. 6
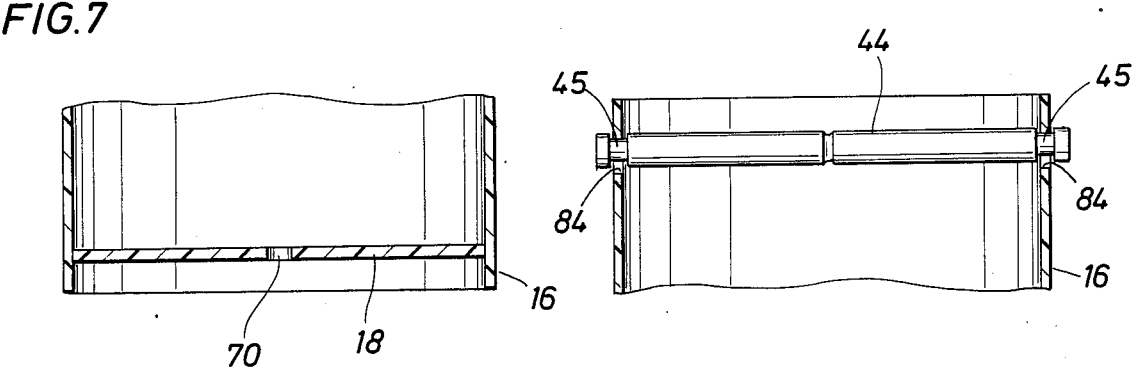
FIG. 7
FIG. 8
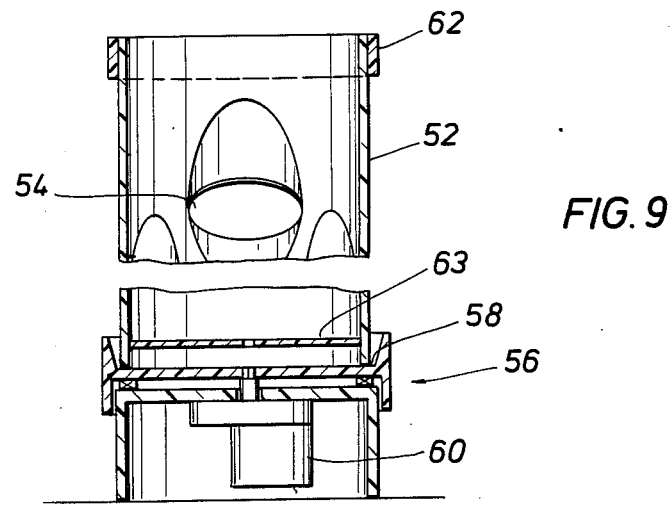
FIG. 9

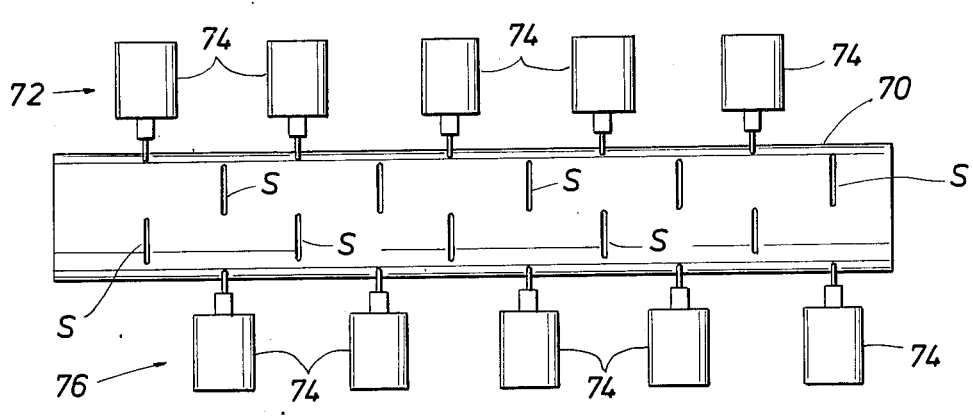
FIG. 10
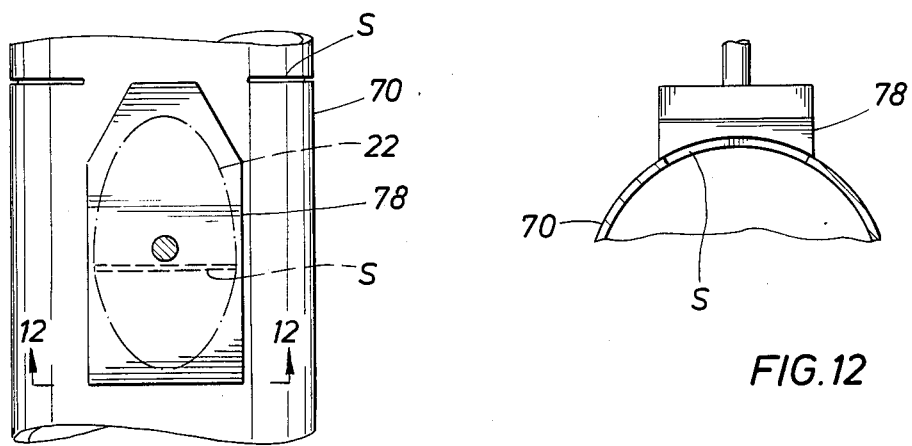
FIG. 11
FIG. 12
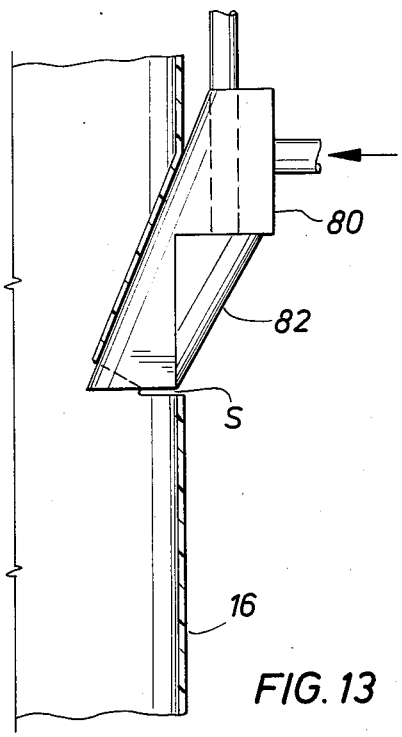
FIG. 13
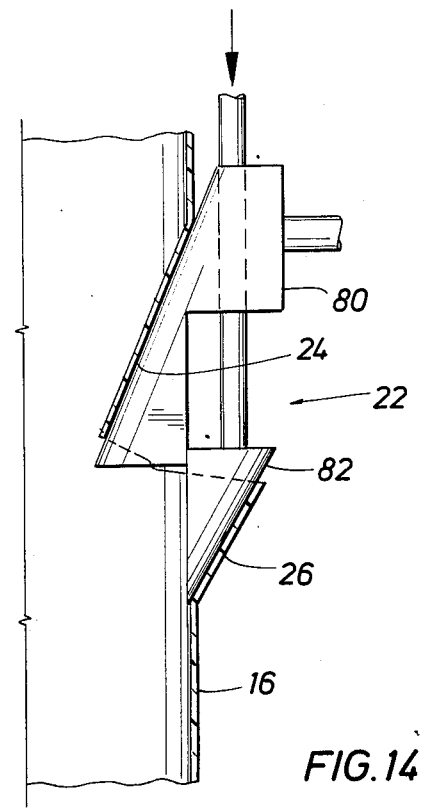
FIG. 14

PLANTER AND METHOD OF PRODUCING SAME

This application is a continuation of application Ser. No. 505,102 filed June 10, 1983 now abandoned.

BACKGROUND

The advantages of a single structure which has a plurality of planting locations or pockets has long been recognized. A planting jar having a plurality of openings in which plants may grow is suggested in U.S. Pat. No. 1,993,631. Post type of planters used in the desert by the Israelis is disclosed in the April 1982 issue of National Geographic (Page 452). Such posts are set in the ground and have a plurality of pockets with pockets on adjacent sides of the posts being offset vertically and watering hoses delivering water to the open upper end of the posts. The R. M. Mills U.S. Pat. No. No. 3,394,495 discloses another planter having multiple pockets and such planter is formed of pockets formed by slits in the rubber and held open by spacers. Another multiple pocket planter is shown in U.S. Pat. No. 4,123,873 as a truncated pyramid with a plurality of formed pockets on each side.

One disadvantage of such planters in most locations is that the plantings on the sides do not receive equal amounts of light. For this reason, it is advantageous that the multiple pocket planter be rotated. Rotation of planters is disclosed in U.S. Pat. Nos. 4,026,067; 4,051,627; 4,250,666; 3,360,885 (motor driven planter bases); 3,957,242; 4,170,843 (hanging planters having rotary mounting to allow rotation; U.S. Pat. No. 4,041,641 (planters floating in an enclosure and moved by a pipe sweeping the surface of the container and driven by an electric motor, a water wheel or a windmill); U.S. Pat. No. 4,117,630 (a hanging planter driven by a weight operated motor such as a clock mechanism); and, U.S. Pat. No. 4,227,343 (a planter rotated by the interaction between a compressed spring and a linear-to-rotary mechanism responsive to weight loss of the planter due to water evaporation.

Summary

The improved planter of the present invention has a tubular plastic body with a plurality of planting pockets in said tube, a bottom in said tube to support growing soil therein, and means for supporting and rotating said tube. The improved planter producing method includes the steps of cutting a plurality of spaced radial slots in a tube of thermoplastic material, heating the area of each of the pockets to be formed, forming the upper portion of each pocket inward, forming the lower portion of each pocket outward and securing a bottom to said tube.

An object of the present invention is to provide an improved planter having a plurality of planting spaces which is easily made and planted.

Another object is to provide an improved planter which is easily rotated to provide uniform light exposure to all of the planting pockets.

A further object is to provide an improved tubular planter in which plant growth is simple and uniform.

Still another object is to provide an improved method of producing a planter which is efficient in cost of materials and labor.

BRIEF DESCRIPTION OF THE DRAWINGS

These and other objects and advantages of the present invention are hereinafter set forth and explained with reference to the drawings wherein:

FIG. 1 is an elevation view of the improved hanger of the present invention shown hanging from a vertical surface.

FIG. 2 is an enlarged elevation view of one pocket of the improved hanger of the present invention.

FIG. 3 is a detail sectional view of the pocket taken along line 3—3 in FIG. 2.

FIG. 4 is an elevation view of the hanging support shown in FIG. 1.

FIG. 5 is an exploded view of the planter tube, the vanes, the hanger rod and the bottom.

FIG. 6 is a plan view of the device of FIG. 1 taken along line 6—6.

FIG. 7 is a detail sectional view of the tube and bottom taken along line 7—7 in FIG. 1.

FIG. 8 is a detail sectional view of the support rod taken along line 8—8 in FIG. 1.

FIG. 9 is an elevation view of the motor driven form of the improved planter of the present invention.

FIG. 10 is a schematic view of the slot cutting step of the method of the present invention.

FIG. 11 is a schematic plan view of the heating step.

FIG. 12 is a schematic sectional view of the heating setup taken along line 12—12 in FIG. 11.

FIG. 13 is a schematic view of the step of forming of the top portion of the pocket.

FIG. 14 is a schematic view of the step of forming of the lower portion of the pocket.

FIG. 15 is a schematic view of the step of cutting the holes in the tube to receive the support rod and the step of cutting slots in the tube for the fins.

DESCRIPTION OF THE PREFERRED EMBODIMENT

The improved structure of the present invention is shown in FIG. 1 as hanging planter 10. Planter 10 is shown supported from a vertical surface, such as tree 12, by support means 14 which is hereinafter described in detail with reference to FIG. 4. Planter 10 includes a cylindrical tube 16 with bottom 18 secured within the lower end of tube 16. Bottom 18 is secured within tube 16 by suitable adhesive, such as a solvent for the material of tube 16. The solvent can be applied to the exterior of bottom 18 after it is positioned within tube 16. It is not necessary that a complete seal be provided in securing the exterior of bottom 18 within tube 16 since bottom 18 is provided with drain opening 20.

Tube 16 is preferably a thermoplastic material and is formed as hereinafter described, to have a plurality of pockets 22. As shown, there are six vertical or axial rows being displaced or offset vertically or axially from each other so that there are three pockets at each level and adjacent pockets are not on the same level.

As shown in FIGS. 2 and 3, each of pockets 22 includes an upper inwardly extending concave recess 24 and a lower outwardly extending convex projection 26. Recess 24 has a generally partial conical shape and projection 26 has a similar shape but is formed outward to create pocket 22 into which plants can be placed when planter 10 is filled with suitable planting soil. Hook 27 may be inserted above pocket 22 as shown in FIG. 3 to support plants growing up from pocket 22.

Hanging planter 10 includes means for rotating it so that it will not remain in the same position at all times. Such means includes arcuate fins 28 wihch are inserted into slots 30 in the upper end of tube 16. The curvature of fins 28 all face in the same direction with respect to the axis of tube 16 and in this position one face or the concave side of fins 28 catches the wind while the other face or convex side allows the wind to flow freely thereby. Each of fins 28 include slot 32 into which the edge of tube 16 at the lower end of slot 30 engages to fix the position of fins 28.

The purpose of having the means for rotating is to be sure that all pockets 22 are exposed to sunlight. With hanging planter 10, the provision of fins 28 on tube 16 are effective to provide sufficient movement of planter 10 so that plants in all of pockets 22 will have uniform growth. With fins 28 on tube 16, support means 14 allows a relative free rotation of tube 16 responsive to the air currents blowing over tube 16.

Support means 14 includes hook 34 secured into tree 12, arm 36 having angle plate 38 at its inner end in engagement with tree 12 and groove 40 at its outer end from which support tension member 42 such as cable 42 which extends downward to engage in groove 43 in support pin 44 which is positioned across the upper portion of tube 16. Cable 42 includes loops 46 and 48 on its ends to engage in grooves 40 and 43. Chain 46 is connected to angle plate 38, extends over hook 34 and engages the outer end of arm 36. Cable 42, which is preferred to be a stranded cable, is sufficiently strong to support the complete load of planter 10 when it is completely filled with planting soil, plants and water. Cable 42 also is sufficiently long and has the ability of allow the rotation of planter 10 through several complete turns responsive to light movement of air therepast before it causes planter 10 to rotate in the opposite direction. Tension member or cable 42 is important in that it allows rotation of planter 10 in light winds on slight rotational torque but with heavier or steady winds an additional rotation is resisted to stop continued rotation of the planter and prevent damage to the plants by resisting spinning of the planter.

With the structure shown and described, hanging planter 10 is suitable for the planting of plants in each pocket 22 and to allow each plant sufficient light for proper growth and the arrangement of pockets 22 allows water to be added to the open top of tube 16 and each plant receives adequate water.

A modified form of the present invention is shown in FIG. 9. Planter 56 shown in FIG. 9 includes tube 52 having pockets 54 and is substantially the same as planter 10 except that it is not a hanging planter. Planter 56 is vertically positioned on stand 56 which includes upper dish 58 on which planter 56 rests and motor 60 which is connected to rotate dish 58. Collar 62 surrounds the upper end of tube 52 to reinforce it. Also, bottom 63 is secured within the lower portion of tube 52.

Planter 56 can be used indoors with a plant growth light or in front of a window so that the rotation of planter 56 exposes all of the plants to the light.

The improved method of producing the planter of the present invention is schematically illustrated in FIGS. 10 through 15. Tube 70 which is a polyvinylchloride tube of preselected length is mounted in a position for rotation between upper battery 72 of routers 74 and lower battery 76 of routers 74. Upper and lower batteries are interconnected so that they are moved simultaneously into a radial position by drilling holes into tube 70. Once the bits of routers 74 have entered tube 70, tube 70 is rotated to provide the desired length of slots S. With the router bits being positioned radially the ends of each of the slots S are radial. It has been found that the radial ends of the slots S avoid tearing of tube 70 in the forming steps. As shown in FIG. 10, the bits of routers 74 are offset with respect to each other to provide the axial offset of adjacent pockets previously discussed. When two sets of slots S have been cut, both batteries of routers 74 are retracted and tube 70 is rotated 120°. The slot cutting is repeated, the tube is rotated 120° in the same direction and the final slots are cut.

After slots S are cut, the areas of the pockets are heated individually as shown in FIGS. 11 and 12. Heating iron 78 is shaped to have approximately the configuration of pocket 22 which is shown in FIG. 11 in dashed lines. Heating iron 78 is held at a temperature in the range of from 275° F. to 350° F. so that when it rests over a pocket area for a period of one to two minutes the material above and below slot S is heated to the desired forming temperature.

Forming of each pocket 22 is accomplished in two steps as shown in FIGS. 13 and 14. Shoe 80 is forced radially into tube 70 above slot S forming upper recess 24 as shown in FIG. 13. With upper recess 24 formed, toe 82 of shoe 80 is moved downward to form lower projection 26 as shown in FIG. 14. Toe 82 and shoe 80 are retained in the position shown in FIG. 14 until the material of tube 70 cools sufficiently to set and then toe 82 is retracted and shoe 80 is lifted from engagement with tube 70.

It is preferred that as with slot cutting that the heating and forming steps be accomplished so that all pockets in one axial or vertical row and all of the pockets in the opposed vertical rows. While forming takes place on two rows heating can be conducted in adjacent rows. Also, to decrease further the time for forming, cooling of the formed pockets may be provided in any desired form such as cooling of shoe 80 and toe 82.

The step of cutting slots 30 in the top end of the tube 16 is illustrated in FIG. 15 and is preferably accomplished at substantially the same time as the drilling of holes 84 for receiving support pin 44. Holes 84 are substantially the same diameter as the outer ends of support pin 44, larger than the diameter of outer grooves 45 of pin 44 and smaller than the diameter of the portions of pins 44 immediately inward of outer groove 45. Slots 30 are cut to a length equal to one-half the width of fins 28 and the slots 32 in fins 28 are of the same length. Slots 30 are cut by router 86 and holes 84 are drilled by drills 88 having bits of suitable size. Drills 88 are used at the same time since tube 16 is flexible and the drilling operation functions better when both holes are drilled at the same time.

It is preferred that the tube be a tubular polyvinylchloride having a diameter in the range from 6 to 10 inches and a wall thickness between 0.075 and 0.125 inches with an overall length between 36 and 84 inches. The preferred cable diameter is between 0.045 and 0.125 inches. The pocket density is preferred to be ⅓ to ⅔ pockets per lineal inch of tube length. The maximum depth of the pockets is between 60% and 125% of the pocket width.

What is claimed is:

1. An improved hanging planter structure comprising:

an elongated tubular cylindrical planter having a bottom, an open upper end, and a plurality of planting pockets spaced axially and circumferentially along the outer surface of the tubular planter, each of said pockets communicating with the inside of the planter and defined between an upper inwardly extending recess and a lower outwardly extending projection, said pockets adapted to receive plants upon filling of the inside of the planter with suitable planting soil;

a support pin mounted on said planter and extending across the open upper end thereof, a ropelike support for the tubular planter having its lower end secured to said support pin and its upper end secured to an overhead support means thereby to suspend the planter from the overhead support means;

a plurality of fins secured in circumferentially spaced relation about and extending laterally outwardly from the outer circular surface of the elongated cylindrical planter adjacent the upper end thereof; and means mounting said fins on said planter adjacent the lower end of the ropelike support to receive an air current or wind for rotation of the planter about its longitudinal axis thereby to expose plants therein to desired light, the rotation of the planter in one direction resulting in a twisting of the ropelike support which progressively increases its resistance to such rotation of the planter upon a continuous rotation of the planter in said one direction.

2. An improved hanging planter structure as set forth in claim 1 wherein said fins are arcuate in shape and have a concave side to receive the air current for rotating said planter.

3. An improved hanging planter structure as set forth in claim 2 wherein said fins and said planter have cooperating interlocking slots for securing the fins on said planter.

* * * * *